Oct. 14, 1930.  B. FISHER  1,778,214
FISH LURE
Filed May 2, 1929
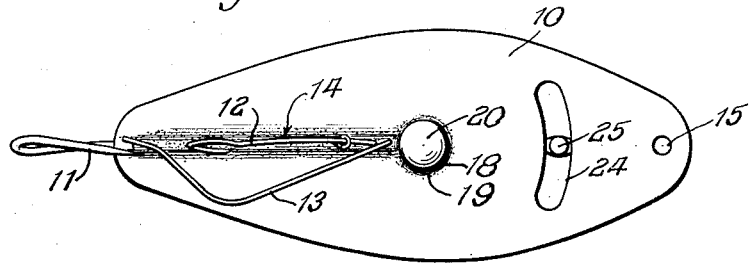
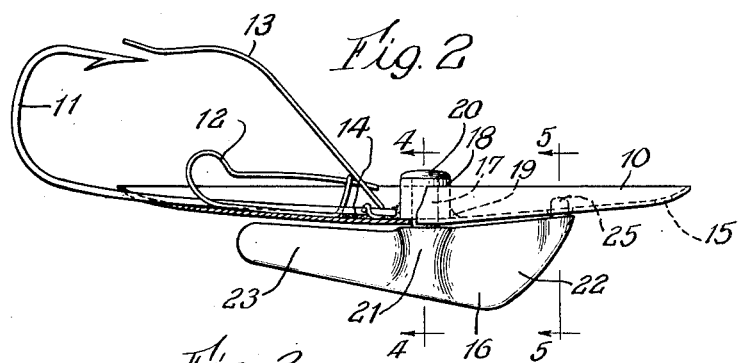
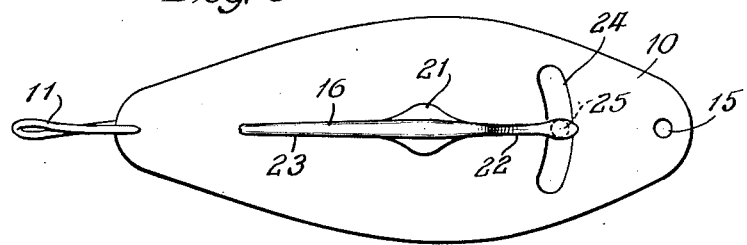
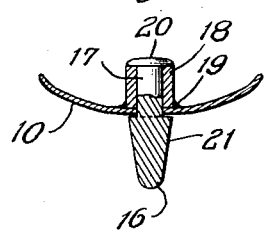
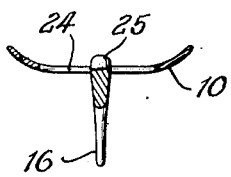
Inventor:
Bart Fisher.
By: Fisher, Clapp, Soans & Pond.
Attys.

Patented Oct. 14, 1930

1,778,214

UNITED STATES PATENT OFFICE

BART FISHER, OF OAK PARK, ILLINOIS

FISH LURE

Application filed May 2, 1929. Serial No. 359,738.

This invention relates to a fish lure or spoon and has particular reference to the type of fish lure which is drawn through water so as to attract the fish.

The principal object of the invention is to provide a fish lure of the type referred to wherein the lure is caused to move in a devious course as an incident to its movement through the water.

In the drawing I have shown a fish lure embodying a preferred form of construction in which the features of my invention are incorporated and in which drawing:

Fig. 1 is a plan;

Fig. 2 is a side view partly in elevation and partly in section;

Fig. 3 is a bottom plan; and

Figs. 4 and 5 are sections on the lines 4—4 and 5—5 respectively of Fig. 2.

Referring now to the drawing, my improved fish lure comprises a body member 10 which, in the present instance, is formed of pressed sheet metal, the metal being a non-rusting one or treated so as to be rust proof, brass being a preferred metal for this purpose. As clearly shown in Fig. 2, the body 10 is dished. A hook 11, bait pin 12, and weed deflector 13, well known in the art, is mounted on the body 10 in any suitable manner, for instance by means of soldering, as indicated at 14. The construction and mounting of the elements 11, 12 and 13 forms no part of the present invention and hence, need not be described in further detail. An aperture 15 is provided in the front end of the body for facilitating connection in a line to the body.

For causing the body 10 to move through an irregular, devious course when drawn through the water, I provide a keel-like part or wiggler 16 which is pivoted to the body 10 preferably on the bottom thereof. As clearly shown in Figs. 2 and 4, the part 16 is provided with an upwardly extending pivot pin 17 which fits a bearing sleeve 18, the latter being secured to the body 10 in any suitable manner, for instance by means of soldering, as indicated at 19. The upper end of the pivot pin 17 may be headed over the upper end of the bearing sleeve 18 as shown at 20, to retain the part 16 in assembled position relative to the body 10. As clearly shown, the pivot pin 17 is of such length intermediate the headed part 20 and the body of the part 16 that the latter is freely pivotally movable in the bearing 18, i. e., there is no binding action between the body of the part 16 and the bottom of the body part 10 or between the top of the bearing 18 and the headed portion 20 of the pivot pin.

By inspection of Figs. 3, 4 and 5, it will be seen that the wiggler 16 is a comparatively thin keel-like member having an enlargement 21 intermediate its ends, the latter being provided as an incident to the provision of the pivot pin 17. The latter may be made integral with the part 16 as shown in Fig. 4 or it may be a separate element secured to the part 16 in any suitable manner. The upper edge of the part 16 is made to conform more or less closely to the shape of the bottom of the body 10, as clearly shown in Fig. 2, and the arrangement is such that the end portions of the wiggler on opposite sides of its pivot axis, substantially counter balance each other so that there is no tendency for the pivoted part to move on its pivot when the lure is out of normal horizontal position, due merely to the effect of gravity. The surface area of the front portion 22 of the part 16 is preferably greater than the surface area of the rear portion 23 so that if the pressure of a current of water is applied uniformly to one entire side of the wiggler the total pressure on the front portion will be greater than the total pressure on the rear portion so that the wiggler will accordingly be caused to swing on its pivot. It will, however, be understood that this is not important since, as a practical matter, when the lure is drawn through water, the front portion of the wiggler will first be engaged by a water current and will be swung on its pivot before the rear portion of the wiggler is brought into the actuating current. Obviously, the same current of water acting on the rear portion of the wiggler when the lure is emerging from the current, will effect reverse pivotal movement of the wiggler to accordingly affect the course of movement of the body. For limiting pivotal movement of the part 16, I provide the body 10 with a slot 24 which receives an upwardly projecting pin portion 25 of the part 16, which portion extends through the slot as, best shown in Fig. 5. Obviously, pivotal movement of the wiggler is thus limited by engagement of the upwardly projecting portion 25 with the ends of the slot 24.

It will be seen that the keel-like wiggler 16 is caused to swing from side to side on its pivot 17 as an incident to movement of the lure through a body of water, it being understood, of course, that there are numerous independent or more or less unrelated currents in practically all bodies of water, which currents are moving in various directions. The above described keel-like wiggler construction may, of course, be applied to various types of body members and, hence, is not restricted to the form above described. Any suitable means may, of course, be provided for limiting the pivotal movement of the pivoted part 16.

I am aware that changes in the construction and form of the above described embodiment of my invention may be made without departing from the spirit of my invention, the scope of which should, accordingly, be determined by reference to the following claims, the same being construed as broadly as possible consistent with the state of the art.

I claim as my invention:

1. In a fish lure, the combination of a body member and a part movably mounted on said body for free movement as an incident to travel of the lure through water, said part serving to haphazardly divert said body horizontally in opposite directions from its normal course when drawn through water, and means for limiting movement of said part relative to said body.

2. In a fish lure, the combination of a body member and a rudder part movably mounted on said body member intermediate the ends of the latter and adapted to be moved as an incident to changes in water currents when the body member is drawn through water, thereby to cause said body to move in a devious course.

3. In a fish lure, the combination of a body member and a part pivoted to the bottom of said body, intermediate the ends of the latter, so as to be adjustable as an incident to variations in water current pressures against the sides of said pivoted part, for causing said body to move in a devious course when drawn through water.

4. In a fish lure, the combination of a body member adapted to be drawn through water, and means for causing the body member to move in a devious course, said means comprising a keel-like rudder pivoted on a normally vertical axis on the bottom of said body, intermediate the ends of the latter, and adapted to be swung on its axis as an incident to variations in the pressure or direction of currents of the water engaging said part.

5. In a fish lure, the combination of a body member adapted to be drawn through water, and means for causing the body member to move in a devious course, said means comprising a keel-like rudder pivoted on a normally vertical axis on the bottom of said body, intermediate the ends of the latter, and adapted to be swung on its axis as an incident to variations in the pressure or direction of currents of the water engaging said part, said part being pivoted intermediate its ends and the portions of said part on opposite sides of said pivot substantially counter-balancing each other.

BART FISHER.